US010797839B2

(12) United States Patent
Da Silva et al.

(10) Patent No.: US 10,797,839 B2
(45) Date of Patent: Oct. 6, 2020

(54) APPARATUS, SYSTEM AND METHOD OF COMMUNICATING AN ENHANCED DIRECTIONAL MULTI-GIGABIT (EDMG) PHYSICAL LAYER PROTOCOL DATA UNIT (PPDU)

(71) Applicant: INTEL IP CORPORATION, Santa Clara, CA (US)

(72) Inventors: Claudio Da Silva, Portland, OR (US); Jonathan Kosloff, Tel Aviv (IL); Michael Genossar, Modiin (IL); Artyom Lomayev, Nizhny Novgorod (RU); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/322,238

(22) PCT Filed: Mar. 30, 2017

(86) PCT No.: PCT/US2017/024917
§ 371 (c)(1),
(2) Date: Jan. 31, 2019

(87) PCT Pub. No.: WO2018/044354
PCT Pub. Date: Mar. 8, 2018

(65) Prior Publication Data
US 2019/0199499 A1 Jun. 27, 2019

Related U.S. Application Data

(60) Provisional application No. 62/382,302, filed on Sep. 1, 2016.

(51) Int. Cl.
H04L 5/00 (2006.01)
H04B 7/12 (2006.01)
(Continued)

(52) U.S. Cl.
CPC ......... *H04L 5/0048* (2013.01); *H04B 7/0617* (2013.01); *H04B 7/12* (2013.01);
(Continued)

(58) Field of Classification Search
CPC ..... H04W 16/28; H04W 72/04; H04W 84/12; H04W 74/00; H04L 27/26; H04L 27/2602;
(Continued)

(56) References Cited

U.S. PATENT DOCUMENTS

2013/0089000 A1  4/2013  Hansen et al.
2014/0177543 A1  6/2014  Cordeiro
(Continued)

FOREIGN PATENT DOCUMENTS

WO   2018071057   4/2018

OTHER PUBLICATIONS

International Preliminary Report on Patentability for International Application No. PCT/US2017/024917, dated Mar. 14, 2018, 9 pages.
(Continued)

*Primary Examiner* — Jung Liu
(74) *Attorney, Agent, or Firm* — Shichrur & Co.

(57) ABSTRACT

Some demonstrative embodiments include apparatuses, devices, systems and methods of communicating an Enhanced Directional Multi-Gigabit (EDMG) Physical Layer Protocol Data Unit (PPDU). For example, an apparatus may include logic and circuitry configured to cause a wireless station to transmit a first portion of an EDMG PPDU in a duplicate mode including transmission of a plurality of duplicates of the first portion of the PPDU over a respective plurality of 2.16 Gigahertz (GHz) channels in a directional frequency band, the first portion of the EDMG PPDU including at least one header field of the EDMG (Continued)

PPDU; and to transmit a second portion of the EDMG PPDU over a signal bandwidth of a channel including the plurality of 2.16 GHz channels, the second portion of the EDMG PPDU including at least a Training (TRN) field of the EDMG PPDU.

18 Claims, 6 Drawing Sheets

(51) Int. Cl.
| | |
|---|---|
| *H04W 84/12* | (2009.01) |
| *H04L 27/26* | (2006.01) |
| *H04B 7/06* | (2006.01) |
| *H04B 7/0413* | (2017.01) |

(52) U.S. Cl.
CPC ............ *H04L 5/001* (2013.01); *H04L 5/0023* (2013.01); *H04L 27/2602* (2013.01); *H04W 84/12* (2013.01); *H04B 7/0413* (2013.01)

(58) Field of Classification Search
CPC ... H04L 5/0048; H04L 5/0053; H04B 7/0617; H04B 7/0695; H04B 7/0452; H04B 7/0417; H04B 7/0456; H04B 7/10
See application file for complete search history.

(56) References Cited

U.S. PATENT DOCUMENTS

| | | | |
|---|---|---|---|
| 2015/0249491 A1 | 9/2015 | Tsukizawa et al. | |
| 2016/0164800 A1* | 6/2016 | Eitan ....................... | H04L 47/80 370/389 |
| 2016/0190686 A1 | 6/2016 | Gao et al. | |
| 2016/0192363 A1 | 6/2016 | Kasher et al. | |
| 2016/0249332 A1* | 8/2016 | Xin ....................... | H04L 5/0053 |
| 2017/0134076 A1* | 5/2017 | Maamari .............. | H04B 7/0452 |
| 2017/0317727 A1* | 11/2017 | Wang .................... | H04B 7/0452 |
| 2019/0081674 A1* | 3/2019 | Oteri ..................... | H04B 7/0421 |
| 2019/0123798 A1* | 4/2019 | Lou ....................... | H04B 7/0456 |
| 2019/0140730 A1* | 5/2019 | Oteri ..................... | H04B 7/0452 |
| 2019/0174328 A1* | 6/2019 | Park ....................... | H04L 27/26 |

OTHER PUBLICATIONS

International Preliminary Report on Patentability for International Application No. PCT/US2017/024937, dated Apr. 25, 2019, 7 pages.

International Search Report and the Written Opinion for International Application No. PCT/US2017/024937, dated Jul. 3, 2017, 10 pages.

International Search Report and the Written Opinion for International Application No. PCT/US2017/024917, dated Jun. 27, 2017, 12 pages.

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

James Wang et al., "11ay DL MU-MIMO BF Training and User Selection", IEEE 802.11-16/0405r1, Mar. 13, 2016, 17 pages.

Kyungtae Jo et al., "Generalized Multi-Beamforming for 11ay", IEEE 802.11-16/0398r1, Mar. 17, 2016, 9 pages.

Assaf Kasher, "Beamforming Training proposals", IEEE802.11-16/0103r0, Jan. 18, 2016, 15 pages.

* cited by examiner

APPARATUS, SYSTEM AND METHOD OF COMMUNICATING AN ENHANCED DIRECTIONAL MULTI-GIGABIT (EDMG) PHYSICAL LAYER PROTOCOL DATA UNIT (PPDU)

CROSS REFERENCE

This Application claims the benefit of and priority from U.S. Provisional Patent Application No. 62/382,302 entitled "APPARATUS, SYSTEM AND METHOD OF COMMUNICATING A PACKET OVER A BONDED CHANNEL IN A DIRECTIONAL FREQUENCY BAND", filed Sep. 1, 2016, the entire disclosure of which is incorporated herein by reference.

TECHNICAL FIELD

Embodiments described herein generally relate to communicating an Enhanced Directional Multi-Gigabit (EDMG) Physical Layer Protocol Data Unit (PPDU).

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
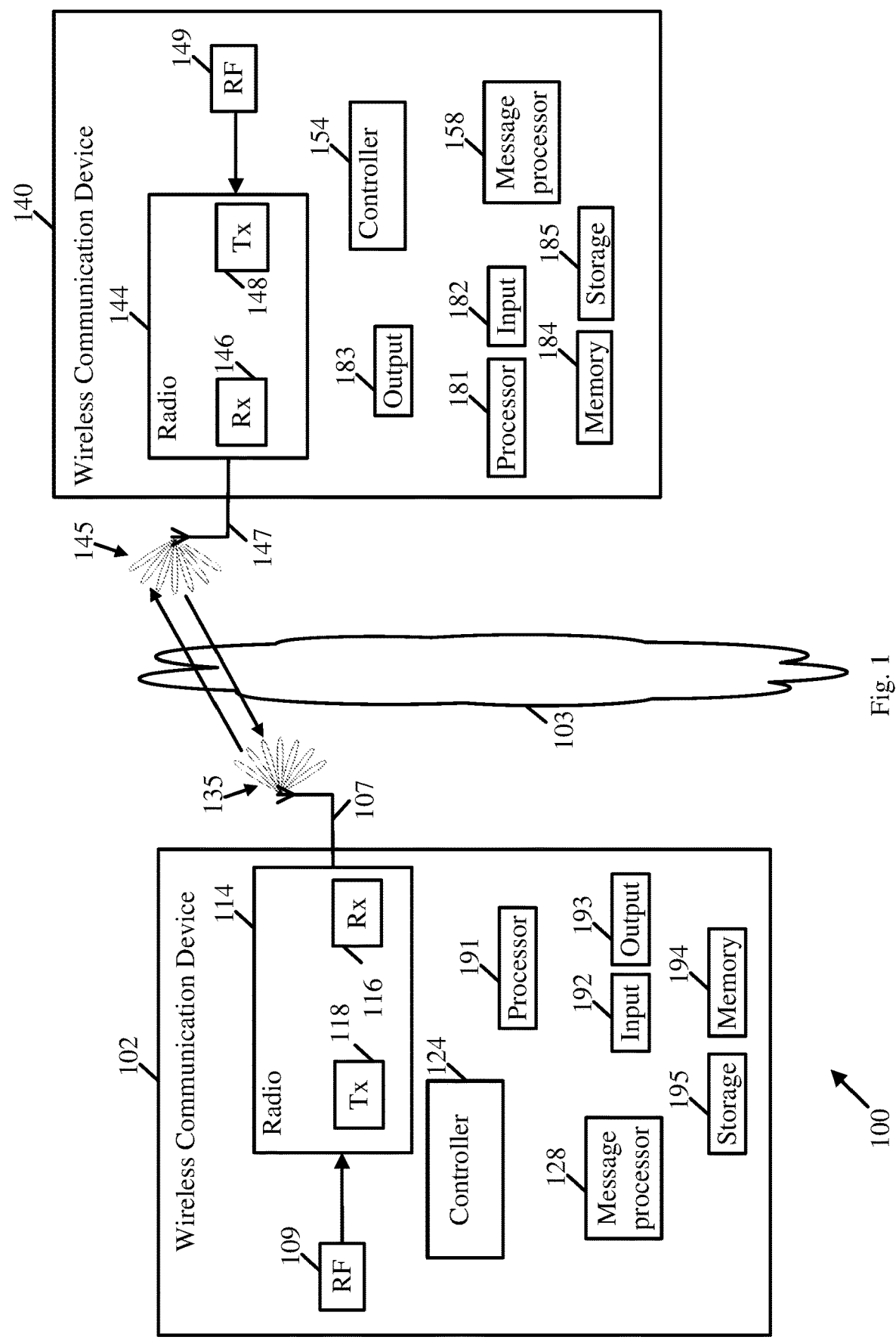
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); IEEE 802.11ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput* for Operation in License-Exempt Bands Above 45 GHz)) and/or future versions and/or derivatives thereof, devices and/or networks operating in accordance with existing WiFi Alliance (WFA) Peer-to-Peer (P2P) specifications (including *WiFi P2P technical specification, version* 1.5, *Aug.* 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 GHz, e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more *IEEE 802.11 Specifications*, e.g., an *IEEE 802.11-2016 Specification*, an *IEEE 802.11ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE 802.11-2016 Specification* and/or an *IEEE 802.11ad Specification*.

In some demonstrative embodiments, devices 102 and/or 140 may be configured according to one or more standards, for example, in accordance with an *IEEE 802.11ay Standard*, which may be, for example, configured to enhance the efficiency and/or performance of an *IEEE 802.11ad Specification*, which may be configured to provide Wi-Fi connectivity in a 60 GHz band.

Some demonstrative embodiments may enable, for example, to significantly increase the data transmission rates defined in the *IEEE 802.11ad Specification*, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to implement one or more mechanisms, which may, for example, enable to extend a single-channel bandwidth (BW) scheme, e.g., a scheme in accordance with the *IEEE 802.11ad Specification* or any other scheme, for higher data rates and/or increased capabilities, e.g., as described below.

In some demonstrative embodiments, devices 102 and/or 140 may be configured to communicate over a channel (also referred to as "EDMG channel", "wide channel", and/or "bonded channel") having a channel bandwidth including a plurality of single-channel BWs, e.g., a plurality of 2.16 GHz channels, as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel bandwidth, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels according to any other channel bonding factor.

In some demonstrative embodiments, devices 102 and/or 140 may be configured to communicate over an NG60 network, an EDMG network, and/or any other network. For example, devices 102 and/or 140 may be configured to use channel bonding, for example, for communicating over the NG60 and/or EDMG networks.

In some demonstrative embodiments, devices 102 and/or 140 may be configured to communicate one or more packets according to a packet structure, which may be configured to support at least communication by stations, for example, EDMG stations, e.g., according to a future *IEEE 802.11ay Specification*, as described below.

In some demonstrative embodiments, the packet structure may be configured, for example, to support stations, e.g., EDMG stations, using bonded channels, for example, at least to reliably and/or efficiently perform one or more beamforming training operations of a beamforming training procedure, which may, for example, be a critical operation for millimeter-wave systems, e.g., as described below.

In some demonstrative embodiments, one distinctive feature of wireless systems operating in a directional frequency band, e.g., frequencies above 45 GHz, is a beamforming mechanism, e.g., directional transmission and reception, which may be implemented, for example, to offset a large free-space path loss of millimeter-wave transmissions, e.g., according to the Friis transmission Law.

In some demonstrative embodiments, beamforming training mechanisms, e.g., in compliance with an *IEEE 802.11ad Specification* and/or an *IEEE 802.11ay Specification*, may be used by a pair of stations, e.g., devices 102 and/or 140, to determine appropriate antenna settings for transmission and/or reception.

In some demonstrative embodiments, a beamforming training procedure may include, for example, a sector-level sweep (SLS), which may be mandatory, during which transmit beamforming training may be performed. The beamforming training procedure may include a Beam Refinement Protocol (BRP) phase, which may be optional, and which may enable to perform receive beamforming training, and/or an iterative refinement of antenna weight vectors (AWVs), e.g., of a transmitter and/or receiver at one or both stations.

In some demonstrative embodiments, devices 102 and/or 140 may be configured to perform a Beamforming procedure (also referred to as "beamforming training protocol") including a Sector level sweep (SLS) phase, e.g., including, for example, an Initiator Sector Sweep (ISS), which may include a sector sweep performed, for example, by a Beamforming initiator, and a responder sector sweep (RSS), which may include a sector sweep performed, for example, by a Beamforming responder. The RSS may, for example, follow the ISS.

In some demonstrative embodiments, devices 102 and 140 may opt to perform a BRP, e.g., following the SLS phase.

Some demonstrative embodiments are described herein with respect to a BRP, which may be performed after a SLS phase of a beamforming procedure. However, in other embodiments, BRP may be performed as part of any other phase and/or procedure.

In some demonstrative embodiments, devices 102 and 140 may exchange a plurality of BRP frames during the BRP. For example, device 102 may send one or more, e.g., a plurality of, BRP frames to device 140, and/or device 140 may send one or more, e.g., a plurality of, BRP frames to device 102.

In some demonstrative embodiments, one of devices 102 and 140 may perform the functionality of a BRP initiator to initiate the exchange of BRP frames, and another one of devices 102 and 140 may perform the functionality of a BRP responder. In one example, device 102 may perform the functionality of the BRP initiator and/or device 140 may perform the functionality of the BRP responder.

In some demonstrative embodiments, the BRP may implement a beam tracking mechanism, which may allow, for example, ongoing refinement of an established beam link during data traffic.

In some demonstrative embodiments, performing the SLS over a primary channel of a Basic Service Set (BSS), e.g., which may have a specified bandwidth of 2.6 GHz, may enable, for example, ensuring backward compatibility with one or more "legacy" Specifications utilizing a single bandwidth channel, e.g., an *IEEE 802.11ad Specification*. However, beamforming training of a transmitter and/or receiver performed in a single bandwidth channel, e.g., the 2.16 GHz channel, may not necessarily be optimal, or may even be satisfactory, for transmissions, e.g., bonded transmissions, over a channel, e.g., a bonded channel, for example, with a channel bandwidth of 4.32, 6.48, or 8.64 GHz, and/or any other channel bandwidth.

In some demonstrative embodiments, devices 102 and/or 140 may be configured to incorporate a beamforming mechanism, which may be configured to allow, for example, at least transmitter and/or receiver training for bonded channel transmissions, for example, by extending the BRP procedure and/or a packet structure utilized for the BRP procedure, e.g., as described below.

In some demonstrative embodiments, devices 102 and/or 140 may be configured to generate, transmit, receive, access, and/or process a BRP packet, which may be configured according to BRP packet structure, which may be configured to support and/or enable stations, e.g., EDMG stations, to perform beamforming training using a bonded signal bandwidth, e.g., an entire bonded signal bandwidth of a bonded channel, e.g., as described below.

In some demonstrative embodiments, the BRP packet structure may provide a mechanism, which may at least specifically address one or more technical issues of beamforming training when channel bonding is used, e.g., as described below.

In some demonstrative embodiments, devices 102 and/or 140 may be configured to communicate one or more packets, for example, one or more BRP packets, according to a Physical Layer Convergence Protocol (PLCP) Protocol Data Unit (PPDU) structure, for example, an EDMG PPDU structure, e.g., as described below.

Figure 2:
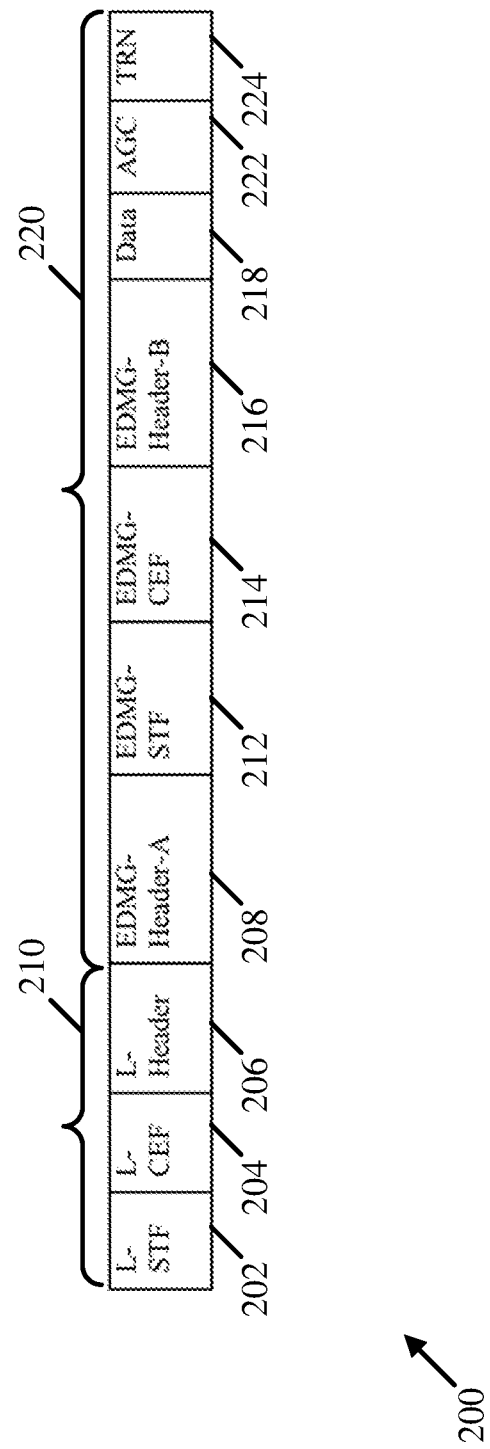
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, to perform beamforming training over a channel, e.g., an EDMG channel, having a channel bandwidth including a plurality of 2.16 GHz channels, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG-Header-B 216, a Data field 218, and/or one or more beamforming training fields, e.g., an AGC field 222 and/or an TRN field 224.

In some demonstrative embodiments, EDMG portion 220 may include some or all of the fields shown in FIG. 2 and/or one or more other additional or alternative fields.

In one example, EDMG portion 220 may not include AGC field 222, for example, TRN field 224 may immediately follow Data field 218.

Referring back to FIG. 1, in some demonstrative embodiments devices 102 and/or 140 may be configured to communicate a BRP packet having a BRP packet structure, which may be compatible with EDMG PPDU 200 (FIG. 2), and may be configured for EDMG channels, e.g., bonded channels, for example, to support and/or enable EDMG stations, e.g., devices 102 and/or 140, to perform beamforming training using the entire EDMG signal bandwidth, e.g., the entire bonded signal bandwidth, e.g., as described below.

In some demonstrative embodiments, the BRP packet structure may include training (TRN) subfields, e.g., TRN field 224 (FIG. 2), and/or AGC subfields, which may be, for example, transmitted using the entire EDMG (bonded) signal bandwidth, e.g., as described below.

In some demonstrative embodiments, the BRP packet structure may be configured utilizing design principles, which may be, for example, in-line with an *IEEE* 802.11*ay Specification*, e.g., as described below.

In some demonstrative embodiments, the BRP packet structure may be configured to address reference signals, which may be used for beamforming training (TRN), e.g., when channel bonding is used.

In some demonstrative embodiments, devices 102 and/or 140 may be configured to communicate a BRP packet over an EDMG channel having a channel bandwidth including a plurality of 2.16 GHz channels, e.g., as described below.

In some demonstrative embodiments, devices 102 and/or 140 may be configured to communicate one or more portions of the BRP duplicated packet over the plurality of 2.16 GHz channels, and, for example, to communicate one or more other portions of the BRP packet over a signal bandwidth, e.g., the entire signal bandwidth, of the EDMG channel including the plurality of 2.16 GHz channels e.g., as described below.

In some demonstrative embodiments, controller 124 may be configured to control, cause, and/or trigger device 102 to transmit a first portion of an EDMG PPDU in a duplicate mode, e.g., as described below.

In some demonstrative embodiments, the duplicate mode may include a transmission of a plurality of duplicates of the first portion of the EDMG PPDU over a respective plurality of 2.16 Gigahertz (GHz) channels in a directional frequency band, e.g., as described below.

In some demonstrative embodiments, the directional frequency band may include a frequency band above 45 GHz.

In some demonstrative embodiments, the first portion of the EDMG PPDU may include at least one header field, e.g., as described below.

For example, message processor 128 may generate the first portion of the EDMG PPDU, and/or transmitter 118 may transmit the first portion of the EDMG PPDU in the duplicate mode, e.g., to device 140.

In some demonstrative embodiments, controller 124 may be configured to control, cause, and/or trigger device 102 to transmit a second portion of the EDMG PPDU over a signal bandwidth of the channel including the plurality of 2.16 GHz channels, e.g., as described below.

In some demonstrative embodiments, the second portion of the EDMG PPDU may include at least a Training (TRN) field, e.g., as described below.

In one example, message processor 128 may generate the second portion of the EDMG PPDU, and/or transmitter 118 may transmit the second portion of the EDMG PPDU, e.g., to device 140, over the signal bandwidth of the channel including the plurality of 2.16 GHz channels.

In some demonstrative embodiments, the EDMG PPDU may include a Beam Refinement Protocol (BRP) PPDU, e.g., as described below.

In other embodiments, the EDMG PPDU may include any other frame or packet.

In some demonstrative embodiments, controller 124 may be configured to control, cause, and/or trigger device 102 to transmit the TRN field of the second portion of the EDMG PPDU, for example, at a transmission rate of $1.76 * N_{CB}$, wherein $N_{CB}$ denotes a count of the plurality of 2.16 GHz channels, e.g., as described below.

For example, message processor 128 may generate the TRN field of the EDMG PPDU, and/or transmitter 118 may transmit the TRN field of the EDMG PPDU, e.g., to device 140, at a transmission rate of 3.52 GHz (1.76*2), for example, when the transmission is over a 4.32 GHz channel ($N_{CB}=2$).

In some demonstrative embodiments, the signal bandwidth of the channel including the plurality of 2.16 GHz channels may include, for example, a channel bandwidth of 4.32 GHz, 6.48 GHz, or 8.64 GHz. In other embodiments, the channel including the plurality of 2.16 GHz channels may have any other channel bandwidth.

In some demonstrative embodiments, controller 124 may be configured to control, cause, and/or trigger device 102 to include in the first portion of the EDMG PPDU a non-EDMG portion, e.g., non-EDMG portion 210 (FIG. 2), including one or more non-EDMG fields, e.g., as described below.

In some demonstrative embodiments, the non-EDMG portion of the EDMG PPDU, e.g., non-EDMG portion 210 (FIG. 2), may include a non-EDMG Short Training Field (L-STF), e.g., L-STF 202 (FIG. 2), a non-EDMG Channel Estimation Field (L-CEF), e.g., L-CEF 204 (FIG. 2), and/or a non-EDMG header field (L-header), e.g., L-header 206 (FIG. 2).

In some demonstrative embodiments, controller 124 may be configured to control, cause, and/or trigger device 102 to include in the first portion of the EDMG PPDU an EDMG Header field, e.g., an EDMG Header A field, e.g., EDMG-Header-A 208 (FIG. 2).

In some demonstrative embodiments, controller 124 may be configured to control, cause, and/or trigger device 102 to include a data field of the EDMG PPDU, e.g., data field 218 (FIG. 1), in the first portion of the EDMG PPDU which is to be transmitted in the duplicate mode over the plurality of 2.16 GHz channels, e.g., as described below.

In some demonstrative embodiments, controller 124 may be configured to control, cause, and/or trigger device 102 to include a data field of the EDMG PPDU, e.g., data field 218 (FIG. 1), in the second portion of the EDMG PPDU which is to be transmitted over the signal bandwidth of the of the channel including the plurality of 2.16 GHz channels, e.g., as described below.

In some demonstrative embodiments, controller 154 may be configured to control, cause, and/or trigger device 140 to receive the EDMG PPDU from device 102 over the EDMG channel, e.g., as described below.

In some demonstrative embodiments, controller 154 may be configured to control, cause, and/or trigger device 140 to receive the first portion of the EDMG PPDU in the duplicate mode for example, over the respective plurality of 2.16 Gigahertz (GHz) channels in the directional frequency band, e.g., as described below.

For example, receiver 146 may receive the first portion of the EDMG PPDU, e.g., from device 102, in the duplicate mode, and/or message processor 158 may be configured to access, process, and/or decode the first portion of the EDMG PPDU.

In some demonstrative embodiments, controller 154 may be configured to control, cause, and/or trigger device 140 to receive the second portion of the EDMG PPDU over the signal bandwidth of the channel including the plurality of 2.16 GHz channels.

For example, receiver 146 may receive the second portion of the EDMG PPDU from device 102 over the signal bandwidth of the channel including the plurality of 2.16 GHz channels, and/or message processor 158 may be configured to access, process, and/or decode the second portion of the EDMG PPDU.

In some demonstrative embodiments, controller 154 may be configured to control, cause, and/or trigger device 140 to perform beamforming training based on, for example, one or more TRN sequences in the TRN field of the EDMG PPDU, e.g., TRN sequences in TRN field 224 (FIG. 2).

In some demonstrative embodiments, controller 154 may be configured to control, cause, and/or trigger device 140 to receive the TRN field of the EDMG PPDU, e.g., TRN field 224 (FIG. 2), at a transmission rate of $1.76*N_{CB}$.

For example, receiver 146 may receive TRN field 224 (FIG. 2) from device 102 at a transmission rate of 3.52 GHz, e.g., over a 4.32 GHz channel, and/or message processor 158 may be configured to access, process, and/or decode TRN field 224 (FIG. 2).

In some demonstrative embodiments, the BRP packet structure described herein may be superior to other possible designs, for example, at least in terms of performance, and/or for example, while maintaining an acceptable implementation complexity, e.g., as described below.

Figure 3:
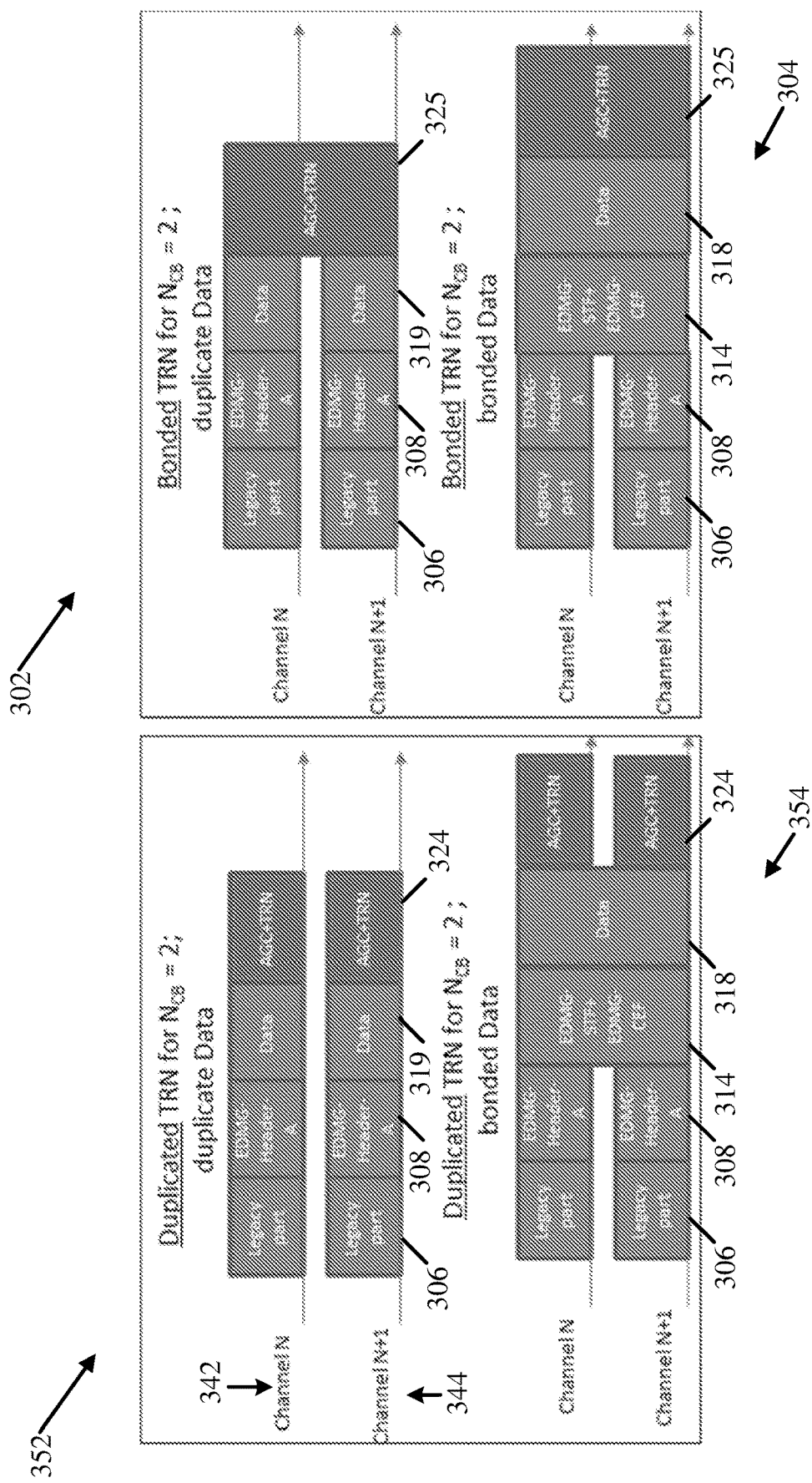
FIG. 3 is a schematic illustration of four EDMG PPDU structures, in accordance with some demonstrative embodiments.

Reference is made to FIG. 3, which schematically illustrates four different EDMG PPDU structures, e.g., including an EDMG PPDU structure 302, an EDMG PPDU structure 304, an EDMG PPDU structure 352, and an EDMG PPDU structure 354, in accordance with some demonstrative embodiments. For example, EDMG PPDUs 302, 304, 352, and/or 354 may include a format of EDMG PPDU 200 (FIG. 2).

In some demonstrative embodiments, PPDUs 302, 304, 352, and/or 354 may include a BRP packet. For example, device 102 (FIG. 1) and/or device 140 (FIG. 1) may be configured to generate, transmit, receive, access and/or process a packet, for example, a BRP packet, according to at least one of the EDMG PPDU structures of FIG. 3.

In some demonstrative embodiments, as shown in FIG. 3, PPDUs 302, 304, 352, and/or 354 may be communicated over an EDMG channel, e.g., a bonded channel, including two single channel bandwidth channels, for example, channels 342 and 344, for example, according to a Channel Bonding (CB) factor $N_{CB}=2$, e.g., with a 4.32 GHz bandwidth. In other embodiments, the packets structure may be configured with respect to any other EDMG channel, e.g., bonded channel, including any other number of 2.16 GHz channels.

In some demonstrative embodiments, the EDMG PPDU structures 302, 304, 352, and/or 354 may include transmission of one or more duplicated portions of PPDUs 302, 304, 352, and/or 354 over the plurality of 2.16 GHz channels covered by the EDMG channel; and/or for example, transmission of one or more non-duplicated portions of PPDUs 302, 304, 352, and/or 354 over the EDMG channel, e.g., as described below.

In some demonstrative embodiments, as shown in FIG. 3, the EDMG PPDUs 302, 304, 352, and/or 354 may be configured to utilize transmission in a duplicate mode of a non-EDMG (legacy) portion 306, and a Header A field 308. For example, non-EDMG portion 306 may include one or more field of non-EDMG portion 210 (FIG. 2), and/or EDMG Header A 308 may include EDMG Header A 208 (FIG. 2).

In some demonstrative embodiments, as shown in FIG. 3, the EDMG PPDUs 302, 304, 352, and/or 354 may be configured to utilize transmission of a data field of the EDMG PPDU in a duplicate mode or a non-duplicate mode, e.g., as described below.

For example, as shown in FIG. 3, EDMG PPDU 352 and/or EDMG PPDU 302 may include duplicate transmission of a data field 319 in duplicate mode, e.g., over each of channels 342 and 344.

For example, as shown in FIG. 3, EDMG PPDU 354 and/or EDMG PPDU 304 may include non-duplicate transmission of a data field 318, e.g., over the signal bandwidth of the EDMG channel including channels 342 and 344. According to this example, EDMG PPDU 354 and/or EDMG PPDU 304 may include non-duplicate transmission of one or more other EDMG fields, for example, EDMG STA and/or CEF fields 314, e.g., over the signal bandwidth of the EDMG channel including channels 342 and 344.

In some demonstrative embodiments, as shown in FIG. 3, the EDMG PPDUs 302, 304, 352, and/or 354 may be configured to utilize transmission of one or more TRN and/or AGC fields of the EDMG PPDU in a duplicate mode or a non-duplicate mode, e.g., as described below.

For example, as shown in FIG. 3, EDMG PPDU 352 and/or EDMG PPDU 354 may include duplicate transmission of one or more TRN and/or AGC fields 324 in duplicate mode, e.g., over each of channels 342 and 344.

For example, as shown in FIG. 3, EDMG PPDU 302 and/or EDMG PPDU 304 may include non-duplicate transmission of one or more TRN and/or AGC fields 325, e.g., over the signal bandwidth of the EDMG channel including channels 342 and 344.

In some demonstrative embodiments, as shown in FIG. 3, transmission of one or more EDMG PPDUs, e.g., EDMG PPDU 302 and/or EDMG PPDU 352, over the EDMG channel, e.g., the bonded channel, may be configured according to a first scheme ("duplicate data"), which may be configured to duplicate a data portion of the PPDU, e.g., Data field 319, to be transmitted in duplicate over each of the channels being bonded, e.g., simultaneously over channels 342 and 344.

In some demonstrative embodiments, as shown in FIG. 3, transmission of one or more EDMG PPDUs, e.g., EDMG PPDU 304 and/or EDMG PPDU 354, over the EDMG channel, e.g., the bonded channel, may be configured according to a second scheme ("bonded data"), which may be configured to transmit the data portion of the PPDU, e.g., Data field 318, as a bonded transmission over the EDMG channel, e.g., the bonded channel, including channels 342 and 344.

In some demonstrative embodiments, as shown in FIG. 3, there may be four packet schemes, e.g., the structures of PPDUs 302, 304, 352, and/or 354, which may be possibly implemented as possible configurations for communicating the TRN and/or AGC fields, for example, when using channel bonding, e.g., over two channels, for example, over channels 342 and 344.

In some demonstrative embodiments, as shown in FIG. 3, a first option for defining the TRN and/or AGC fields for the channel bonding case may include a first AGC/TRN scheme ("Duplicate AGC/TRN"), which may include duplicating the transmission of the TRN and/or AGC fields in the channels being bonded. For example, the EDMG PPDU 352 and/or of the EDMG PPDU 354 may include duplicating the transmission of the TRN and/or AGC fields 324 over the channels 342 and 344, e.g., the channels being bonded. For example, the TRN and/or AGC fields 324 may be configured according to the configuration of the legacy header fields of the PPDU packet, e.g., non-EDMG portion 306. According to this AGC/TRN scheme, the BRP packet transmission in each 2.16 GHz channel may comply, for example, with a packet definition according to an *IEEE* 802.11*ad Specification*.

In some demonstrative embodiments, as shown in FIG. 3, a second option for defining the TRN and/or AGC fields for communication over the EDMG channel, e.g., in the channel bonding case, may include a second AGC/TRN scheme ("Bonded AGC/TRN"), which may include transmission of the TRN and/or AGC fields as a bonded transmission over the EDMG channel, e.g., the bonded channel, for example, as shown in FIG. 3 with respect to the EDMG PPDU 302 and/or the EDMG PPDU 304. According to this AGC/TRN scheme, the transmission of the TRN and/or AGC fields 325 may occupy the entire signal bandwidth of the EDMG channel including channels 342 and 344, e.g., the entire bonded signal bandwidth. For example, a transmission rate of the TRN and/or AGC fields 325 may be, for example, equal to $N_{CB}$ times a single channel rate of 1.76 GHz, wherein $N_{CB}$ denotes the number of channels being bonded. For example, the transmission rate of the TRN and/or AGC fields 325 over a channel bandwidth including two 2.16 GHz channels, may be 3.52 GHz (2*1.76 GHz). For example, a number of symbols that make a TRN field 325 may be $N_{CB}$ times, e.g., 2 times, larger than that of a single channel case.

In some demonstrative embodiments, the Duplicate AGC/TRN scheme and/or the Bonded AGC/TRN scheme may have one or more different performance and/or implementation characteristics, for example, based on one or more implementation, use cases, and/or scenarios, e.g., as follows:

TABLE 1

| | Criterion | Duplicated TRN | Bonded TRN |
|---|---|---|---|
| Performance wise | Matching of BF result to the bonded channel | Spectral occupancy is different. For each pair of bonded channels, duplicated has 400 MHz "holes" in the middle of the PSD | Spectral occupancy is matched to bonded signal |
| | PAPR of signal ToF/ positioning | Larger Hard to take advantage of the higher BW | Smaller Easier to take advantage of the higher BW |
| | Beamforming training | Will likely lead to lower performance when used over banded channel | Can achieve the optimum performance |
| Implementation wise | Rx HW - correlator | Need $N_{CB}$ correlators at 1.76 GHz symbol rate | May need $N_{CB}$ *1.76 correlators with new TRN field for bonding. However, most implementations that use channel bonding will have to include this anyways. |
| | Rx BF algorithms | Various combining issues: After GC may need to modulate and combine the outputs, and find combined peak and combined Hadamard values, etc. Algorithms are more complex. More HV and more power. | Conceptually simpler. HV is simpler. |
| | Bonded to duplicate (and vice versa) transitions | My need to do also transition: From bonded to duplicate in SC | May need to do also transition: From duplicate to wide in control PHY |

In some demonstrative embodiments, according to Table 1, from a performance point of view, the bonded transmission of the TRN and/or AGC fields 325, e.g., in the EDMG PPDU 302 and/or of the EDMG PPDU 304, may be decidedly better compared, e.g., at least in some use cases and/or implementations.

In some demonstrative embodiments, according to Table 1, with respect to implementation complexity, the bonded transmission of the TRN and/or AGC fields 325, e.g., in the EDMG PPDU 302 and/or the EDMG PPDU 304, may be advantageous, e.g., even despite the fact that it may utilize a longer correlator.

In some demonstrative embodiments, the BRP packet structure, e.g., as described above, may allow stations using bonded channels, e.g., IEEE 802.11ay stations, to perform beamforming training, e.g., in an efficient manner.

In some demonstrative embodiments, the BRP packet structure, e.g., as described above, may allow transmitting the TRN and/or AGC fields 325 using the entire (bonded) signal bandwidth, e.g., of the EDMG channel over the plurality of 2.16 GHz channels.

In some demonstrative embodiments, for example, in one implementation, for example, a bonded channel may be formed by $N_{CB}$ channels, e.g., $N_{CB}$*2.16 GHz channels, for example, wherein $1 \le N_{CB} \le 4$. According to this example, a corresponding TRN field, e.g., TRN field 325, may be defined to have a symbol rate of $N_{CB}$*1.76 Giga symbols per second (Gsymbols/sec), and/or to have $N_{CB}$ times the number of symbols of a 2.16 GHz channel TRN field. For example, the TRN field 325 in FIG. 3, e.g., wherein $N_{CB}=2$ (two channels: 342 and 344), may be configured with a symbol rate of 3.52 Gsymbols/sec (2*1.76 Gsymbols/sec).

In some demonstrative embodiments, the BRP packet structure, e.g., as described above, may enable bonded communication of the TRN and/or AGC fields 325 of a PPDU, for example, even without requiring that the data field preceding the bonded TRN field 325 is to be bonded. For example, as shown in FIG. 3, for one type of PPDU, e.g., EDMG PPDU 302, e.g., for a control PHY PPDU 302, a station may duplicate the transmission of the data field 319; and/or for a second type of PPDU, e.g., PPDU 304, for example, a single-carrier PHY PPDU 304, the data field 318 may be transmitted over the entire (bonded) signal bandwidth.

Figure 4:
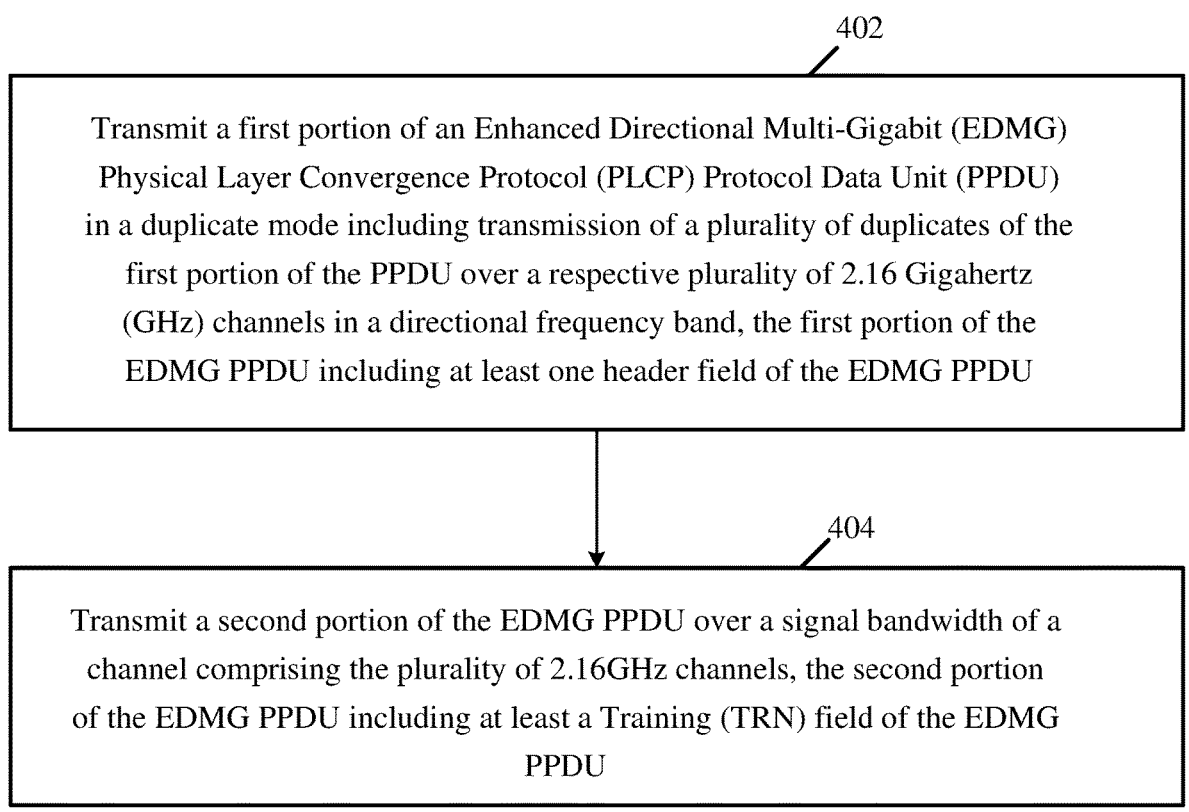
FIG. 4 is a schematic flow-chart illustration of a method of transmitting an EDMG PPDU, in accordance with some demonstrative embodiments.

Reference is made to FIG. 4, which schematically illustrates a method of transmitting an EDMG PPDU, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver, e.g., receiver 116 (FIG. 1), and/or receiver 146 (FIG. 1); and/or a message processor, e.g., message processor 128 (FIG. 1), and/or message processor 158 (FIG. 1).

As indicated at block 402, the method may include transmitting a first portion of an EDMG PPDU in a duplicate mode including transmission of a plurality of duplicates of the first portion of the PPDU over a respective plurality of 2.16 GHz channels in a directional frequency band, the first portion of the EDMG PPDU including at least one header field of the EDMG PPDU. For example, controller 124 (FIG. 1) may control cause and/or trigger device 102 (FIG. 1) to transmit a first portion of the EDMG PPDU in a duplicate mode including transmission of a plurality of duplicates of the first portion of the EDMG PPDU over a plurality of 2.16 GHz channels, e.g., including channels 342 and 344 (FIG. 3), the first portion of the EDMG PPDU including header fields 206 and/or 208 (FIG. 2), e.g., as described above.

As indicated at block 404, the method may include transmitting a second portion of the EDMG PPDU over a signal bandwidth of a channel including the plurality of 2.16 GHz channels, the second portion of the EDMG PPDU including at least a Training (TRN) field of the EDMG PPDU. For example, controller 124 (FIG. 1) may control cause and/or trigger device 102 (FIG. 1) to transmit the second portion of the EDMG PPDU over a signal bandwidth of the channel including the plurality of 2.16 GHz channels, e.g., including channels 342 and 344 (FIG. 3), the second portion of the EDMG PPDU including TRN field 224 (FIG. 2).

Figure 5:
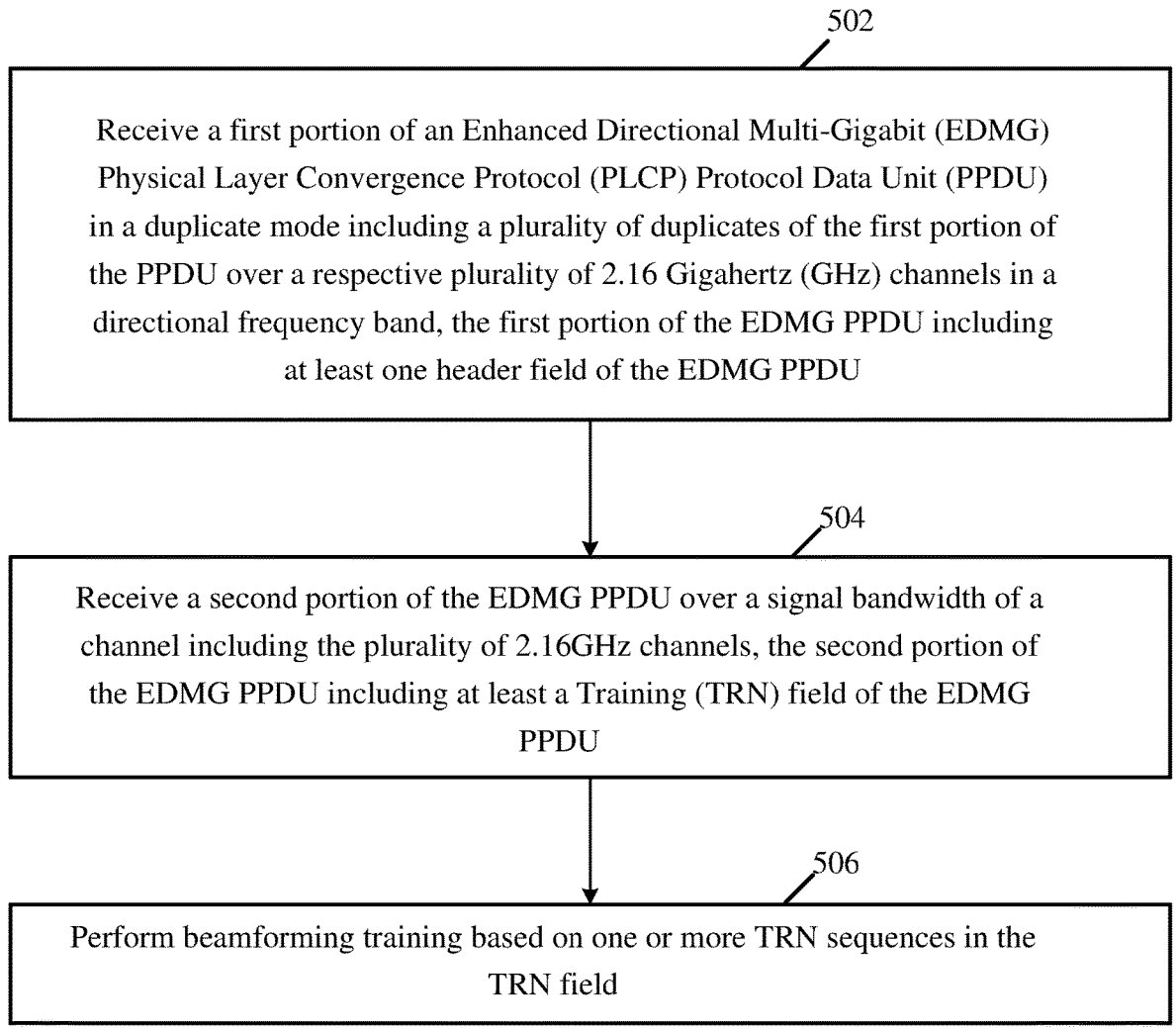
FIG. 5 is a schematic flow-chart illustration of a method of receiving an EDMG PPDU, in accordance with some demonstrative embodiments.

Reference is made to FIG. 5, which schematically illustrates a method of receiving an EDMG PPDU, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver, e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include receiving a first portion of an EDMG PPDU in a duplicate mode including a plurality of duplicates of the first portion of the PPDU over a respective plurality of 2.16 GHz channels in a directional frequency band, the first portion of the EDMG PPDU including at least one header field of the EDMG PPDU. For example, controller 154 (FIG. 1) may control cause and/or trigger device 140 (FIG. 1) to process a first portion of the EDMG PPDU in a duplicate mode including transmission of a plurality of duplicates of the first portion of the EDMG PPDU over a plurality of 2.16 GHz channels, e.g., including channels 342 and 344 (FIG. 3), e.g., as described above.

As indicated at block 504, the method may include receiving a second portion of the EDMG PPDU over a signal bandwidth of a channel including the plurality of 2.16 GHz channels, the second portion of the EDMG PPDU including at least a Training (TRN) field of the EDMG PPDU. For example, controller 154 (FIG. 1) may control cause and/or trigger device 140 (FIG. 1) to receive the second portion of the EDMG PPDU over a signal bandwidth of a channel including the plurality of 2.16 GHz channels, e.g., including channels 342 and 344 (FIG. 3), the second portion of the EDMG PPDU including TRN field 224 (FIG. 2).

As indicated at block 506, the method may include performing beamforming training based on one or more TRN sequences in the TRN field. For example, controller 154 (FIG. 1) may control cause and/or trigger device 140 (FIG. 1) to perform beamforming training based on one or more TRN sequences in TRN field 224 (FIG. 2).

Figure 6:
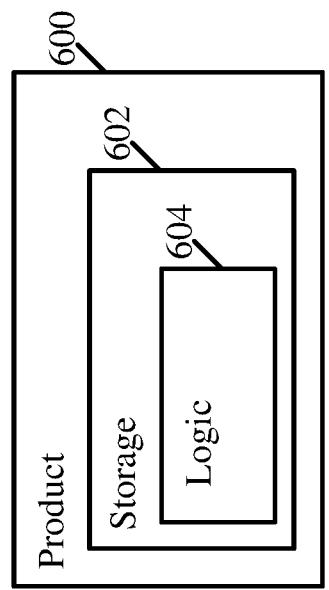
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), and/or message processor 158 (FIG. 1) to perform one or more operations, and/or to perform, trigger and/or implement one or more operations, communications and/or functionalities described above with reference to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to transmit a first portion of an Enhanced Directional Multi-Gigabit (EDMG) Physical Layer Convergence Protocol (PLCP) Protocol Data Unit (PPDU) in a duplicate mode comprising transmission of a plurality of duplicates of the first portion of the PPDU over a respective plurality of 2.16 Gigahertz (GHz) channels in a directional frequency band, the first portion of the EDMG PPDU comprising at least one header field of the EDMG PPDU; and transmit a second portion of the EDMG PPDU over a signal bandwidth of a channel comprising the plurality of 2.16 GHz channels, the second portion of the EDMG PPDU comprising at least a Training (TRN) field of the EDMG PPDU.

Example 2 includes the subject matter of Example 1, and optionally, wherein the first portion of the EDMG PPDU comprises a non-EDMG portion comprising one or more non-EDMG fields.

Example 3 includes the subject matter of Example 2, and optionally, wherein the non-EDMG portion comprises a non-EDMG Short Training Field (L-STF), a non-EDMG Channel Estimation Field (L-CEF), and a non-EDMG header field (L-header).

Example 4 includes the subject matter of any one of Examples 1-3, and optionally, wherein the first portion of the EDMG PPDU comprises an EDMG Header A field.

Example 5 includes the subject matter of any one of Examples 1-4, and optionally, wherein the first portion of the EDMG PPDU comprises a data field of the EDMG PPDU.

Example 6 includes the subject matter of any one of Examples 1-4, and optionally, wherein the second portion of the EDMG PPDU comprises a data field of the EDMG PPDU.

Example 7 includes the subject matter of any one of Examples 1-6, and optionally, wherein the apparatus is configured to cause the wireless station to transmit the TRN field at a transmission rate of 1.76*NCB, wherein NCB denotes a count of the plurality of 2.16 GHz channels.

Example 8 includes the subject matter of any one of Examples 1-7, and optionally, wherein the EDMG PPDU comprises a Beam Refinement Protocol (BRP) PPDU.

Example 9 includes the subject matter of any one of Examples 1-8, and optionally, wherein the channel comprises a channel bandwidth of at least 4.32 GHz.

Example 10 includes the subject matter of any one of Examples 1-9, and optionally, wherein the channel comprises a channel bandwidth of 4.32 GHz, 6.48 GHz, or 8.64 GHz.

Example 11 includes the subject matter of any one of Examples 1-10, and optionally, wherein the directional frequency band comprises a frequency band above 45 GHz.

Example 12 includes the subject matter of any one of Examples 1-11, and optionally, comprising a radio to transmit the EDMG PPDU.

Example 13 includes the subject matter of any one of Examples 1-12, and optionally, comprising one or more antennas, a memory, and a processor.

Example 14 includes a system of wireless communication comprising a wireless station, the wireless station comprising one or more antennas; a radio; a memory; a processor; and a controller configured to cause the wireless station to transmit a first portion of an Enhanced Directional Multi-Gigabit (EDMG) Physical Layer Convergence Protocol (PLCP) Protocol Data Unit (PPDU) in a duplicate mode comprising transmission of a plurality of duplicates of the first portion of the PPDU over a respective plurality of 2.16 Gigahertz (GHz) channels in a directional frequency band, the first portion of the EDMG PPDU comprising at least one header field of the EDMG PPDU; and transmit a second portion of the EDMG PPDU over a signal bandwidth of a channel comprising the plurality of 2.16 GHz channels, the second portion of the EDMG PPDU comprising at least a Training (TRN) field of the EDMG PPDU.

Example 15 includes the subject matter of Example 14, and optionally, wherein the first portion of the EDMG PPDU comprises a non-EDMG portion comprising one or more non-EDMG fields.

Example 16 includes the subject matter of Example 15, and optionally, wherein the non-EDMG portion comprises a non-EDMG Short Training Field (L-STF), a non-EDMG Channel Estimation Field (L-CEF), and a non-EDMG header field (L-header).

Example 17 includes the subject matter of any one of Examples 14-16, and optionally, wherein the first portion of the EDMG PPDU comprises an EDMG Header A field.

Example 18 includes the subject matter of any one of Examples 14-17, and optionally, wherein the first portion of the EDMG PPDU comprises a data field of the EDMG PPDU.

Example 19 includes the subject matter of any one of Examples 14-17, and optionally, wherein the second portion of the EDMG PPDU comprises a data field of the EDMG PPDU.

Example 20 includes the subject matter of any one of Examples 14-19, and optionally, wherein the controller is configured to cause the wireless station to transmit the TRN field at a transmission rate of 1.76*NCB, wherein NCB denotes a count of the plurality of 2.16 GHz channels.

Example 21 includes the subject matter of any one of Examples 14-20, and optionally, wherein the EDMG PPDU comprises a Beam Refinement Protocol (BRP) PPDU.

Example 22 includes the subject matter of any one of Examples 14-21, and optionally, wherein the channel comprises a channel bandwidth of at least 4.32 GHz.

Example 23 includes the subject matter of any one of Examples 14-22, and optionally, wherein the channel comprises a channel bandwidth of 4.32 GHz, 6.48 GHz, or 8.64 GHz.

Example 24 includes the subject matter of any one of Examples 14-23, and optionally, wherein the directional frequency band comprises a frequency band above 45 GHz.

Example 25 includes the subject matter of any one of Examples 14-24, and optionally, wherein the radio is to transmit the EDMG PPDU.

Example 26 includes a method to be performed at a wireless station, the method comprising transmitting a first portion of an Enhanced Directional Multi-Gigabit (EDMG) Physical Layer Convergence Protocol (PLCP) Protocol Data Unit (PPDU) in a duplicate mode comprising transmission of a plurality of duplicates of the first portion of the PPDU over a respective plurality of 2.16 Gigahertz (GHz) channels in a directional frequency band, the first portion of the EDMG PPDU comprising at least one header field of the EDMG PPDU; and transmitting a second portion of the EDMG PPDU over a signal bandwidth of a channel comprising the plurality of 2.16 GHz channels, the second portion of the EDMG PPDU comprising at least a Training (TRN) field of the EDMG PPDU.

Example 27 includes the subject matter of Example 26, and optionally, wherein the first portion of the EDMG PPDU comprises a non-EDMG portion comprising one or more non-EDMG fields.

Example 28 includes the subject matter of Example 27, and optionally, wherein the non-EDMG portion comprises a non-EDMG Short Training Field (L-STF), a non-EDMG Channel Estimation Field (L-CEF), and a non-EDMG header field (L-header).

Example 29 includes the subject matter of any one of Examples 26-28, and optionally, wherein the first portion of the EDMG PPDU comprises an EDMG Header A field.

Example 30 includes the subject matter of any one of Examples 26-29, and optionally, wherein the first portion of the EDMG PPDU comprises a data field of the EDMG PPDU.

Example 31 includes the subject matter of any one of Examples 26-29, and optionally, wherein the second portion of the EDMG PPDU comprises a data field of the EDMG PPDU.

Example 32 includes the subject matter of any one of Examples 26-31, and optionally, comprising transmitting the TRN field at a transmission rate of 1.76*NCB, wherein NCB denotes a count of the plurality of 2.16 GHz channels.

Example 33 includes the subject matter of any one of Examples 26-32, and optionally, wherein the EDMG PPDU comprises a Beam Refinement Protocol (BRP) PPDU.

Example 34 includes the subject matter of any one of Examples 26-33, and optionally, wherein the channel comprises a channel bandwidth of at least 4.32 GHz.

Example 35 includes the subject matter of any one of Examples 26-34, and optionally, wherein the channel comprises a channel bandwidth of 4.32 GHz, 6.48 GHz, or 8.64 GHz.

Example 36 includes the subject matter of any one of Examples 26-35, and optionally, wherein the directional frequency band comprises a frequency band above 45 GHz.

Example 37 includes a product comprising one or more tangible computer-readable non-transitory storage media comprising computer-executable instructions operable to, when executed by at least one processor, enable the at least one processor to cause a wireless station to transmit a first portion of an Enhanced Directional Multi-Gigabit (EDMG) Physical Layer Convergence Protocol (PLCP) Protocol Data Unit (PPDU) in a duplicate mode comprising transmission of a plurality of duplicates of the first portion of the PPDU over a respective plurality of 2.16 Gigahertz (GHz) channels in a directional frequency band, the first portion of the EDMG PPDU comprising at least one header field of the EDMG PPDU; and transmit a second portion of the EDMG PPDU over a signal bandwidth of a channel comprising the plurality of 2.16 GHz channels, the second portion of the EDMG PPDU comprising at least a Training (TRN) field of the EDMG PPDU.

Example 38 includes the subject matter of Example 37, and optionally, wherein the first portion of the EDMG PPDU comprises a non-EDMG portion comprising one or more non-EDMG fields.

Example 39 includes the subject matter of Example 38, and optionally, wherein the non-EDMG portion comprises a non-EDMG Short Training Field (L-STF), a non-EDMG Channel Estimation Field (L-CEF), and a non-EDMG header field (L-header).

Example 40 includes the subject matter of any one of Examples 37-39, and optionally, wherein the first portion of the EDMG PPDU comprises an EDMG Header A field.

Example 41 includes the subject matter of any one of Examples 37-40, and optionally, wherein the first portion of the EDMG PPDU comprises a data field of the EDMG PPDU.

Example 42 includes the subject matter of any one of Examples 37-40, and optionally, wherein the second portion of the EDMG PPDU comprises a data field of the EDMG PPDU.

Example 43 includes the subject matter of any one of Examples 37-42, and optionally, wherein the instructions, when executed, cause the wireless station to transmit the TRN field at a transmission rate of 1.76*NCB, wherein NCB denotes a count of the plurality of 2.16 GHz channels.

Example 44 includes the subject matter of any one of Examples 37-43, and optionally, wherein the EDMG PPDU comprises a Beam Refinement Protocol (BRP) PPDU.

Example 45 includes the subject matter of any one of Examples 37-44, and optionally, wherein the channel comprises a channel bandwidth of at least 4.32 GHz.

Example 46 includes the subject matter of any one of Examples 37-45, and optionally, wherein the channel comprises a channel bandwidth of 4.32 GHz, 6.48 GHz, or 8.64 GHz.

Example 47 includes the subject matter of any one of Examples 37-46, and optionally, wherein the directional frequency band comprises a frequency band above 45 GHz.

Example 48 includes an apparatus of wireless communication by a wireless station, the apparatus comprising means for transmitting a first portion of an Enhanced Directional Multi-Gigabit (EDMG) Physical Layer Convergence Protocol (PLCP) Protocol Data Unit (PPDU) in a duplicate mode comprising transmission of a plurality of duplicates of the first portion of the PPDU over a respective plurality of 2.16 Gigahertz (GHz) channels in a directional frequency band, the first portion of the EDMG PPDU comprising at least one header field of the EDMG PPDU; and means for transmitting a second portion of the EDMG PPDU over a signal bandwidth of a channel comprising the plurality of 2.16 GHz channels, the second portion of the EDMG PPDU comprising at least a Training (TRN) field of the EDMG PPDU.

Example 49 includes the subject matter of Example 48, and optionally, wherein the first portion of the EDMG PPDU comprises a non-EDMG portion comprising one or more non-EDMG fields.

Example 50 includes the subject matter of Example 49, and optionally, wherein the non-EDMG portion comprises a non-EDMG Short Training Field (L-STF), a non-EDMG Channel Estimation Field (L-CEF), and a non-EDMG header field (L-header).

Example 51 includes the subject matter of any one of Examples 48-50, and optionally, wherein the first portion of the EDMG PPDU comprises an EDMG Header A field.

Example 52 includes the subject matter of any one of Examples 48-51, and optionally, wherein the first portion of the EDMG PPDU comprises a data field of the EDMG PPDU.

Example 53 includes the subject matter of any one of Examples 48-51, and optionally, wherein the second portion of the EDMG PPDU comprises a data field of the EDMG PPDU.

Example 54 includes the subject matter of any one of Examples 48-53, and optionally, comprising means for transmitting the TRN field at a transmission rate of 1.76*NCB, wherein NCB denotes a count of the plurality of 2.16 GHz channels.

Example 55 includes the subject matter of any one of Examples 48-54, and optionally, wherein the EDMG PPDU comprises a Beam Refinement Protocol (BRP) PPDU.

Example 56 includes the subject matter of any one of Examples 48-55, and optionally, wherein the channel comprises a channel bandwidth of at least 4.32 GHz.

Example 57 includes the subject matter of any one of Examples 48-56, and optionally, wherein the channel comprises a channel bandwidth of 4.32 GHz, 6.48 GHz, or 8.64 GHz.

Example 58 includes the subject matter of any one of Examples 48-57, and optionally, wherein the directional frequency band comprises a frequency band above 45 GHz.

Example 59 includes an apparatus comprising logic and circuitry configured to cause a wireless station to receive a first portion of an Enhanced Directional Multi-Gigabit (EDMG) Physical Layer Convergence Protocol (PLCP) Protocol Data Unit (PPDU) in a duplicate mode comprising a plurality of duplicates of the first portion of the PPDU over a respective plurality of 2.16 Gigahertz (GHz) channels in a directional frequency band, the first portion of the EDMG PPDU comprising at least one header field of the EDMG PPDU; receive a second portion of the EDMG PPDU over a signal bandwidth of a channel comprising the plurality of 2.16 GHz channels, the second portion of the EDMG PPDU comprising at least a Training (TRN) field of the EDMG PPDU; and perform beamforming training based on one or more TRN sequences in the TRN field.

Example 60 includes the subject matter of Example 59, and optionally, wherein the first portion of the EDMG PPDU comprises a non-EDMG portion comprising one or more non-EDMG fields.

Example 61 includes the subject matter of Example 60, and optionally, wherein the non-EDMG portion comprises a non-EDMG Short Training Field (L-STF), a non-EDMG Channel Estimation Field (L-CEF), and a non-EDMG header field (L-header).

Example 62 includes the subject matter of any one of Examples 59-61, and optionally, wherein the first portion of the EDMG PPDU comprises an EDMG Header A field.

Example 63 includes the subject matter of any one of Examples 59-62, and optionally, wherein the first portion of the EDMG PPDU comprises a data field of the EDMG PPDU.

Example 64 includes the subject matter of any one of Examples 59-62, and optionally, wherein the second portion of the EDMG PPDU comprises a data field of the EDMG PPDU.

Example 65 includes the subject matter of any one of Examples 59-64, and optionally, wherein the apparatus is configured to cause the wireless station to receive the TRN field at a transmission rate of 1.76*NCB, wherein NCB denotes a count of the plurality of 2.16 GHz channels.

Example 66 includes the subject matter of any one of Examples 59-65, and optionally, wherein the EDMG PPDU comprises a Beam Refinement Protocol (BRP) PPDU.

Example 67 includes the subject matter of any one of Examples 59-66, and optionally, wherein the channel comprises a channel bandwidth of at least 4.32 GHz.

Example 68 includes the subject matter of any one of Examples 59-67, and optionally, wherein the channel comprises a channel bandwidth of 4.32 GHz, 6.48 GHz, or 8.64 GHz.

Example 69 includes the subject matter of any one of Examples 59-68, and optionally, wherein the directional frequency band comprises a frequency band above 45 GHz.

Example 70 includes the subject matter of any one of Examples 59-69, and optionally, comprising a radio to receive the EDMG PPDU.

Example 71 includes the subject matter of any one of Examples 59-70, and optionally, comprising one or more antennas, a memory, and a processor.

Example 72 includes a system of wireless communication comprising a wireless station, the wireless station comprising one or more antennas; a radio; a memory; a processor; and a controller configured to cause the wireless station to receive a first portion of an Enhanced Directional Multi-Gigabit (EDMG) Physical Layer Convergence Protocol (PLCP) Protocol Data Unit (PPDU) in a duplicate mode comprising a plurality of duplicates of the first portion of the PPDU over a respective plurality of 2.16 Gigahertz (GHz) channels in a directional frequency band, the first portion of the EDMG PPDU comprising at least one header field of the EDMG PPDU; receive a second portion of the EDMG PPDU over a signal bandwidth of a channel comprising the plurality of 2.16 GHz channels, the second portion of the EDMG PPDU comprising at least a Training (TRN) field of the EDMG PPDU; and perform beamforming training based on one or more TRN sequences in the TRN field.

Example 73 includes the subject matter of Example 72, and optionally, wherein the first portion of the EDMG PPDU comprises a non-EDMG portion comprising one or more non-EDMG fields.

Example 74 includes the subject matter of Example 73, and optionally, wherein the non-EDMG portion comprises a non-EDMG Short Training Field (L-STF), a non-EDMG Channel Estimation Field (L-CEF), and a non-EDMG header field (L-header).

Example 75 includes the subject matter of any one of Examples 72-74, and optionally, wherein the first portion of the EDMG PPDU comprises an EDMG Header A field.

Example 76 includes the subject matter of any one of Examples 72-75, and optionally, wherein the first portion of the EDMG PPDU comprises a data field of the EDMG PPDU.

Example 77 includes the subject matter of any one of Examples 72-75, and optionally, wherein the second portion of the EDMG PPDU comprises a data field of the EDMG PPDU.

Example 78 includes the subject matter of any one of Examples 72-77, and optionally, wherein the controller is configured to cause the wireless station to receive the TRN field at a transmission rate of $1.76*NCB$, wherein NCB denotes a count of the plurality of 2.16 GHz channels.

Example 79 includes the subject matter of any one of Examples 72-78, and optionally, wherein the EDMG PPDU comprises a Beam Refinement Protocol (BRP) PPDU.

Example 80 includes the subject matter of any one of Examples 72-79, and optionally, wherein the channel comprises a channel bandwidth of at least 4.32 GHz.

Example 81 includes the subject matter of any one of Examples 72-80, and optionally, wherein the channel comprises a channel bandwidth of 4.32 GHz, 6.48 GHz, or 8.64 GHz.

Example 82 includes the subject matter of any one of Examples 72-81, and optionally, wherein the directional frequency band comprises a frequency band above 45 GHz.

Example 83 includes the subject matter of any one of Examples 72-82, and optionally, wherein the radio is to receive the EDMG PPDU.

Example 84 includes a method to be performed at a wireless station, the method comprising receiving a first portion of an Enhanced Directional Multi-Gigabit (EDMG) Physical Layer Convergence Protocol (PLCP) Protocol Data Unit (PPDU) in a duplicate mode comprising a plurality of duplicates of the first portion of the PPDU over a respective plurality of 2.16 Gigahertz (GHz) channels in a directional frequency band, the first portion of the EDMG PPDU comprising at least one header field of the EDMG PPDU; receiving a second portion of the EDMG PPDU over a signal bandwidth of a channel comprising the plurality of 2.16 GHz channels, the second portion of the EDMG PPDU comprising at least a Training (TRN) field of the EDMG PPDU; and performing beamforming training based on one or more TRN sequences in the TRN field.

Example 85 includes the subject matter of Example 84, and optionally, wherein the first portion of the EDMG PPDU comprises a non-EDMG portion comprising one or more non-EDMG fields.

Example 86 includes the subject matter of Example 85, and optionally, wherein the non-EDMG portion comprises a non-EDMG Short Training Field (L-STF), a non-EDMG Channel Estimation Field (L-CEF), and a non-EDMG header field (L-header).

Example 87 includes the subject matter of any one of Examples 84-86, and optionally, wherein the first portion of the EDMG PPDU comprises an EDMG Header A field.

Example 88 includes the subject matter of any one of Examples 84-87, and optionally, wherein the first portion of the EDMG PPDU comprises a data field of the EDMG PPDU.

Example 89 includes the subject matter of any one of Examples 84-87, and optionally, wherein the second portion of the EDMG PPDU comprises a data field of the EDMG PPDU.

Example 90 includes the subject matter of any one of Examples 84-89, and optionally, comprising receiving the TRN field at a transmission rate of $1.76*NCB$, wherein NCB denotes a count of the plurality of 2.16 GHz channels.

Example 91 includes the subject matter of any one of Examples 84-90, and optionally, wherein the EDMG PPDU comprises a Beam Refinement Protocol (BRP) PPDU.

Example 92 includes the subject matter of any one of Examples 84-91, and optionally, wherein the channel comprises a channel bandwidth of at least 4.32 GHz.

Example 93 includes the subject matter of any one of Examples 84-92, and optionally, wherein the channel comprises a channel bandwidth of 4.32 GHz, 6.48 GHz, or 8.64 GHz.

Example 94 includes the subject matter of any one of Examples 84-93, and optionally, wherein the directional frequency band comprises a frequency band above 45 GHz.

Example 95 includes a product comprising one or more tangible computer-readable non-transitory storage media comprising computer-executable instructions operable to, when executed by at least one processor, enable the at least one processor to cause a wireless station to receive a first portion of an Enhanced Directional Multi-Gigabit (EDMG) Physical Layer Convergence Protocol (PLCP) Protocol Data Unit (PPDU) in a duplicate mode comprising a plurality of duplicates of the first portion of the PPDU over a respective plurality of 2.16 Gigahertz (GHz) channels in a directional frequency band, the first portion of the EDMG PPDU comprising at least one header field of the EDMG PPDU; receive a second portion of the EDMG PPDU over a signal bandwidth of a channel comprising the plurality of 2.16 GHz channels, the second portion of the EDMG PPDU comprising at least a Training (TRN) field of the EDMG PPDU; and perform beamforming training based on one or more TRN sequences in the TRN field.

Example 96 includes the subject matter of Example 95, and optionally, wherein the first portion of the EDMG PPDU comprises a non-EDMG portion comprising one or more non-EDMG fields.

Example 97 includes the subject matter of Example 96, and optionally, wherein the non-EDMG portion comprises a non-EDMG Short Training Field (L-STF), a non-EDMG Channel Estimation Field (L-CEF), and a non-EDMG header field (L-header).

Example 98 includes the subject matter of any one of Examples 95-97, and optionally, wherein the first portion of the EDMG PPDU comprises an EDMG Header A field.

Example 99 includes the subject matter of any one of Examples 95-98, and optionally, wherein the first portion of the EDMG PPDU comprises a data field of the EDMG PPDU.

Example 100 includes the subject matter of any one of Examples 95-98, and optionally, wherein the second portion of the EDMG PPDU comprises a data field of the EDMG PPDU.

Example 101 includes the subject matter of any one of Examples 95-100, and optionally, wherein the instructions, when executed, cause the wireless station to receive the TRN field at a transmission rate of 1.76*NCB, wherein NCB denotes a count of the plurality of 2.16 GHz channels.

Example 102 includes the subject matter of any one of Examples 95-101, and optionally, wherein the EDMG PPDU comprises a Beam Refinement Protocol (BRP) PPDU.

Example 103 includes the subject matter of any one of Examples 95-102, and optionally, wherein the channel comprises a channel bandwidth of at least 4.32 GHz.

Example 104 includes the subject matter of any one of Examples 95-103, and optionally, wherein the channel comprises a channel bandwidth of 4.32 GHz, 6.48 GHz, or 8.64 GHz.

Example 105 includes the subject matter of any one of Examples 95-104, and optionally, wherein the directional frequency band comprises a frequency band above 45 GHz.

Example 106 includes an apparatus of wireless communication by a wireless station, the apparatus comprising means for receiving a first portion of an Enhanced Directional Multi-Gigabit (EDMG) Physical Layer Convergence Protocol (PLCP) Protocol Data Unit (PPDU) in a duplicate mode comprising a plurality of duplicates of the first portion of the PPDU over a respective plurality of 2.16 Gigahertz (GHz) channels in a directional frequency band, the first portion of the EDMG PPDU comprising at least one header field of the EDMG PPDU; means for receiving a second portion of the EDMG PPDU over a signal bandwidth of a channel comprising the plurality of 2.16 GHz channels, the second portion of the EDMG PPDU comprising at least a Training (TRN) field of the EDMG PPDU; and means for performing beamforming training based on one or more TRN sequences in the TRN field.

Example 107 includes the subject matter of Example 106, and optionally, wherein the first portion of the EDMG PPDU comprises a non-EDMG portion comprising one or more non-EDMG fields.

Example 108 includes the subject matter of Example 107, and optionally, wherein the non-EDMG portion comprises a non-EDMG Short Training Field (L-STF), a non-EDMG Channel Estimation Field (L-CEF), and a non-EDMG header field (L-header).

Example 109 includes the subject matter of any one of Examples 106-108, and optionally, wherein the first portion of the EDMG PPDU comprises an EDMG Header A field.

Example 110 includes the subject matter of any one of Examples 106-109, and optionally, wherein the first portion of the EDMG PPDU comprises a data field of the EDMG PPDU.

Example 111 includes the subject matter of any one of Examples 106-109, and optionally, wherein the second portion of the EDMG PPDU comprises a data field of the EDMG PPDU.

Example 112 includes the subject matter of any one of Examples 106-111, and optionally, comprising means for receiving the TRN field at a transmission rate of 1.76*NCB, wherein NCB denotes a count of the plurality of 2.16 GHz channels.

Example 113 includes the subject matter of any one of Examples 106-112, and optionally, wherein the EDMG PPDU comprises a Beam Refinement Protocol (BRP) PPDU.

Example 114 includes the subject matter of any one of Examples 106-113, and optionally, wherein the channel comprises a channel bandwidth of at least 4.32 GHz.

Example 115 includes the subject matter of any one of Examples 106-114, and optionally, wherein the channel comprises a channel bandwidth of 4.32 GHz, 6.48 GHz, or 8.64 GHz.

Example 116 includes the subject matter of any one of Examples 106-115, and optionally, wherein the directional frequency band comprises a frequency band above 45 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause an Enhanced Directional Multi-Gigabit (EDMG) wireless communication station (STA) to:
transmit a first portion of an EDMG Beam Refinement Protocol (BRP) Physical layer Protocol Data Unit (PPDU) in a duplicate mode by transmission of a plurality of duplicates of the first portion of the EDMG BRP PPDU over a respective plurality of 2.16 Gigahertz (GHz) channels in a frequency band above 45 GHz, the first portion of the EDMG BRP PPDU comprising a non-EDMG portion comprising a plurality of non-EDMG fields of the EDMG BRP PPDU; and
transmit a second portion of the EDMG BRP PPDU over an entire channel bandwidth comprising the plurality of 2.16 GHz channels, the second portion of the EDMG BRP PPDU comprising a Training (TRN) field of the EDMG BRP PPDU, the TRN field transmitted at a rate, which is based on 1.76*NCB, wherein NCB denotes a count of the plurality of 2.16 GHz channels.

2. The apparatus of claim 1 configured to cause the EDMG STA to transmit the EDMG BRP PPDU during a BRP phase for beamforming training over the channel bandwidth comprising the plurality of 2.16 GHz channels.

3. The apparatus of claim 1, wherein the first portion of the EDMG BRP PPDU comprises an EDMG Header A field after the non-EDMG portion.

4. The apparatus of claim 1, wherein the non-EDMG portion comprises a non-EDMG Short Training Field (L-STF), a non-EDMG Channel Estimation Field (L-CEF), and a non-EDMG header field (L-header).

5. The apparatus of claim 1, wherein the channel bandwidth comprises a channel bandwidth of 4.32 GHz and the plurality of 2.16 GHz channels comprises two 2.16 GHz channels.

6. The apparatus of claim 1, wherein the channel bandwidth comprises a channel bandwidth of 6.48 GHz and the plurality of 2.16 GHz channels comprises three 2.16 GHz channels.

7. The apparatus of claim 1, wherein the channel bandwidth comprises a channel bandwidth of 8.64 GHz and the plurality of 2.16 GHz channels comprises four 2.16 GHz channels.

8. The apparatus of claim 1 comprising a radio to transmit the first and second portions of the EDMG BRP PPDU.

9. The apparatus of claim 8 comprising one or more antennas connected to the radio, another memory to store data processed by the EDMG STA, and another processor to execute instructions of an operating system.

10. A product comprising one or more tangible computer-readable non-transitory storage media comprising computer-executable instructions operable to, when executed by at least one processor, enable the at least one processor to cause an Enhanced Directional Multi-Gigabit (EDMG) wireless communication station (STA) to:

transmit a first portion of an EDMG Beam Refinement Protocol (BRP) Physical layer Protocol Data Unit (PPDU) in a duplicate mode by transmission of a plurality of duplicates of the first portion of the EDMG BRP PPDU over a respective plurality of 2.16 Gigahertz (GHz) channels in a frequency band above 45 GHz, the first portion of the EDMG BRP PPDU comprising a non-EDMG portion comprising a plurality of non-EDMG fields of the EDMG BRP PPDU; and transmit a second portion of the EDMG BRP PPDU over an entire channel bandwidth comprising the plurality of 2.16 GHz channels, the second portion of the EDMG BRP PPDU comprising a Training (TRN) field of the EDMG BRP PPDU, wherein the instructions, when executed, cause the EDMG STA to transmit the TRN field at a rate, which is based on 1.76*NCB, wherein NCB denotes a count of the plurality of 2.16 GHz channels.

11. The product of claim 10, wherein the instructions, when executed, cause the EDMG STA to transmit the EDMG BRP PPDU during a BRP phase for beamforming training over the channel bandwidth comprising the plurality of 2.16 GHz channels.

12. The product of claim 10, wherein the first portion of the EDMG BRP PPDU comprises an EDMG Header A field after the non-EDMG portion.

13. The product of claim 10, wherein the non-EDMG portion comprises a non-EDMG Short Training Field (L-STF), a non-EDMG Channel Estimation Field (L-CEF), and a non-EDMG header field (L-header).

14. The product of claim 10, wherein the channel bandwidth comprises a channel bandwidth of 4.32 GHz and the plurality of 2.16 GHz channels comprises two 2.16 GHz channels.

15. The product of claim 10, wherein the channel bandwidth comprises a channel bandwidth of 6.48 GHz and the plurality of 2.16 GHz channels comprises three 2.16 GHz channels.

16. The product of claim 10, wherein the channel bandwidth comprises a channel bandwidth of 8.64 GHz and the plurality of 2.16 GHz channels comprises four 2.16 GHz channels.

17. An apparatus comprising:

means for causing an Enhanced Directional Multi-Gigabit (EDMG) wireless communication station (STA) to transmit a first portion of an EDMG Beam Refinement Protocol (BRP) Physical layer Protocol Data Unit (PPDU) in a duplicate mode by transmission of a plurality of duplicates of the first portion of the EDMG BRP PPDU over a respective plurality of 2.16 Gigahertz (GHz) channels in a frequency band above 45 GHz, the first portion of the EDMG BRP PPDU comprising a non-EDMG portion comprising a plurality of non-EDMG fields of the EDMG BRP PPDU; and means for causing the EDMG STA to transmit a second portion of the EDMG BRP PPDU over an entire channel bandwidth comprising the plurality of 2.16 GHz channels, the second portion of the EDMG BRP PPDU comprising a Training (TRN) field of the EDMG BRP PPDU, wherein the means for causing the EDMG STA to transmit the second portion of the EDMG BRP PPDU comprises means for causing the EDMG STA to transmit the TRN field at a rate, which is based on 1.76*NCB, wherein NCB denotes a count of the plurality of 2.16 GHz channels.

18. The apparatus of claim 17 comprising means for causing the EDMG STA to transmit the EDMG BRP PPDU during a BRP phase for beamforming training over the channel bandwidth comprising the plurality of 2.16 GHz channels.

* * * * *